United States Patent [19]

Shimada

[11] Patent Number: 5,767,474
[45] Date of Patent: Jun. 16, 1998

[54] ELECTRODE TIP REMOVAL APPARATUS

[76] Inventor: Toshiaki Shimada, 2-41-2 Kawauchi Asaminami-ku, Hiroshima, Japan

[21] Appl. No.: 746,197

[22] Filed: Nov. 6, 1996

[30] Foreign Application Priority Data

Nov. 9, 1995 [JP] Japan ................. 7-012890 U

[51] Int. Cl.⁶ ................................................ B23K 11/30
[52] U.S. Cl. ................................. 219/86.8; 219/86.25
[58] Field of Search ............................ 219/86.8, 86.25; 29/762

[56] References Cited

U.S. PATENT DOCUMENTS

| | | | |
|---|---|---|---|
| 4,794,221 | 12/1988 | Takabe et al. | 219/86.8 |
| 4,935,595 | 6/1990 | Fuse | 219/86.25 |
| 5,073,692 | 12/1991 | Jackson et al. | 219/86.8 |
| 5,495,663 | 3/1996 | Saito | 29/762 |

FOREIGN PATENT DOCUMENTS 1214361  2/1986  U.S.S.R. ................. 219/86.8

*Primary Examiner*—Clifford C. Shaw
*Attorney, Agent, or Firm*—Nikaido, Marmelstein, Murray & Oram LLP

[57] ABSTRACT

An electrode tip removal apparatus includes an apparatus body, and a bifurcate arm mounted to the body in such a manner as to be engageable with opposite flat surfaces formed in a circumferential surface of an electrode tip. The opposite flat surfaces are respectively terminated by shoulders closer to a forward end of the electrode tip. The bifurcate arm is driven in such a manner as to be rotatable forwardly and reversely, and movable upwardly and downwardly.

4 Claims, 3 Drawing Sheets

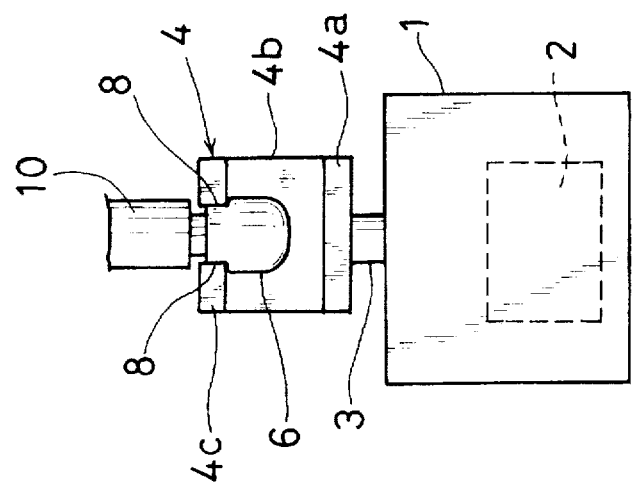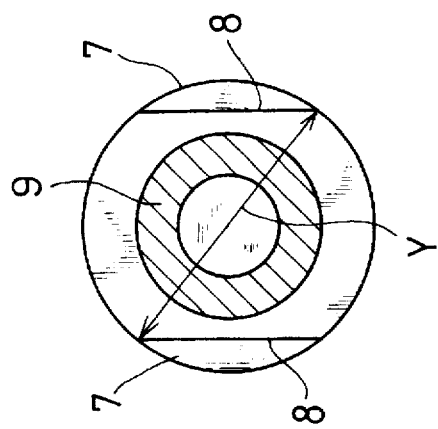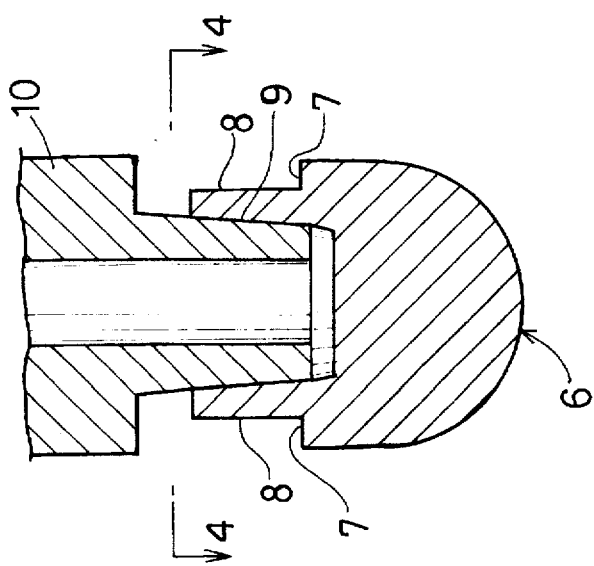

ELECTRODE TIP REMOVAL APPARATUS

BACKGROUND OF THE INVENTION

1. Field of the Invention

The present invention relates to an electrode tip removal apparatus, which is capable of easily removing an electrode tip from a shank used for spot welding.

2. Description of the Prior Art

The electrode tip of this type is illustrated in FIG. 6, in which a tip portion of a shank 10a is loosely fitted into a mounting hole 9a defined in an upper surface of the electrode tip 6a, and is gradually drawn into a tight engagement therewith via pressure which is repeatedly applied at the time that the electrode tip on the shank is pressed against an object to be welded during spot welding.

The tip portion of the electrode tip 6a is worn out by the repeated application to the spot welding, and therefore it is necessary to periodically replace the electrode tip 6a with another one. This replacement operation is conventionally made by a hand tool, such as a spanner and a pipe wrench, with which the electrode tip 6a is removed from the shank 10a.

However, such conventional replacement operation is associated with the following problems.

The spanner is unlikely to securely hold the electrode tip 6a which has usually a rounded cross section. The removal of the electrode tip 6a by the pipe wrench also requires a troublesome work. That is, the electrode tip 6a is to be firmly clamped and subsequently loosened via wrenching action by the pipe wrench. Accordingly, neither the spanner or the pipe wrench contributes to easy replacement operation of the electrode tip 6a.

Therefore, it is an object of the present invention to provide an electrode tip removal apparatus which is capable of easily removing the electrode tip from the shank, and therefore contributes to easy replacement of the electrode tip.

SUMMARY OF THE INVENTION

An electrode tip removal apparatus of the present invention includes an apparatus body, and a bifurcate arm mounted to the body in such a manner as to be engageable with opposite flat surfaces formed in a circumferential surface of an electrode tip. The opposite flat surfaces are respectively terminated by shoulders closer to a forward end of the electrode tip. The bifurcate arm is driven in such a manner as to be rotatable forwardly and reversely, and movable upwardly and downwardly.

In accordance with this embodiment, to remove the electrode tip from a shank for spot welding, the bifurcate arm is first fitted around the opposite flat surfaces of the electrode tip with contacting thereto or spacing apart therefrom, and is rotated via the driving means, while maintaining an engagement relationship with the opposite flat surfaces of the electrode tip. The tight fitting relationship between the electrode tip and the shank becomes loosened as the electrode tip is forcibly rotated.

The bifurcate arm is then lowered via the driving means along the flat surfaces, and abut against the shoulders formed on the lower ends of the flat surfaces. The electrode tip is pushed by the bifurcate arm towards a forward end of the shank, and completely removed from the shank.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 3 is a cross sectional view illustrating an electrode tip in accordance with one embodiment of the present invention;

FIG. 4 is a cross sectional view taken along a line of A—A of FIG. 3;

FIG. 5 is a side elevational view illustrating the electrode tip removing apparatus in actual application.

DETAILED DESCRIPTION OF THE PREFERRED EMBODIMENTS

Figure 1:
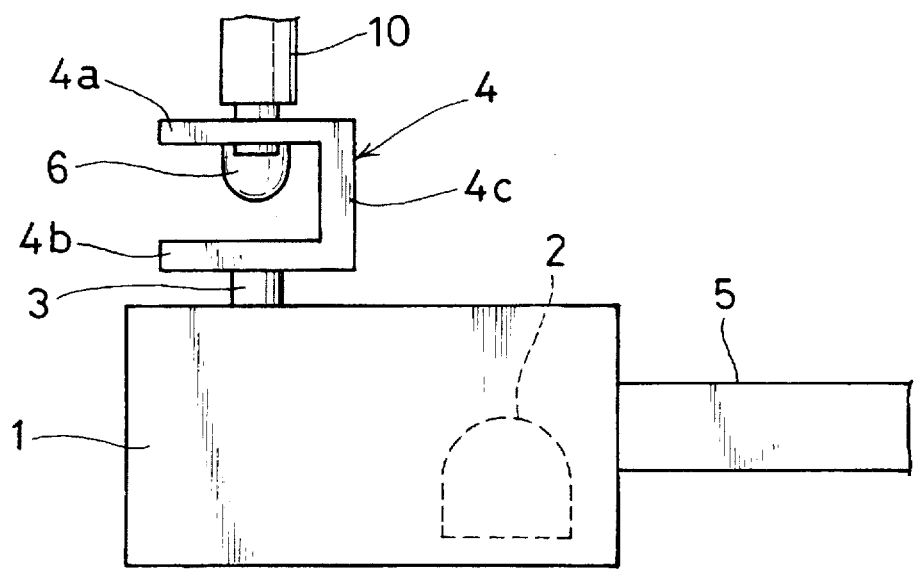
FIG. 1 is a front elevational view illustrating an electrode tip removing apparatus in accordance with one embodiment of the present invention.

Referring to FIG. 1, an apparatus body 1 of a substantially box shape is equipped with a rotational driving means in the form of a motor 2 therein. A power transmission shaft 3 is connected at its one end to the motor 2 so as to be rotatable in forward and reverse directions, and the opposite end thereof protrudes upwardly away from the apparatus body 1.

Figure 2:
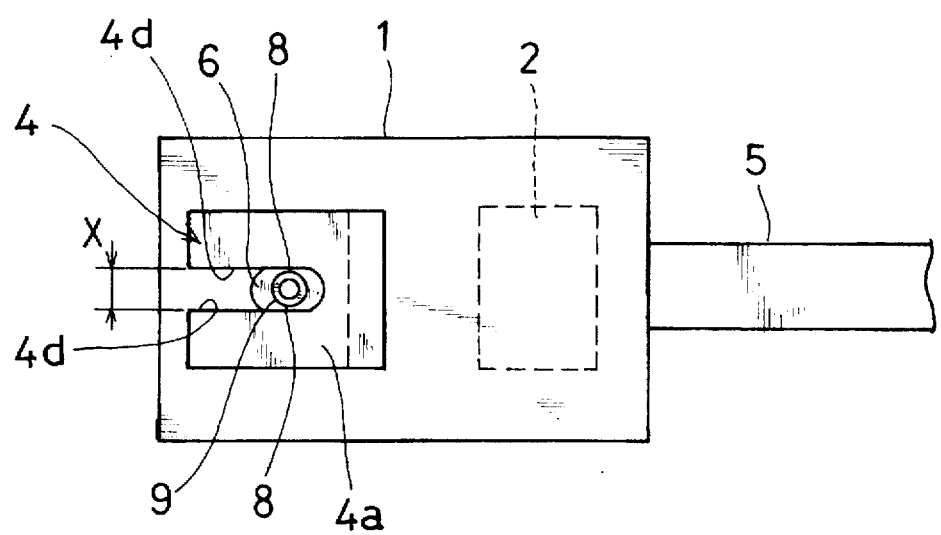
FIG. 2 is a top plan view illustrating the electrode tip removing apparatus of FIG. 1.
Figure 6:
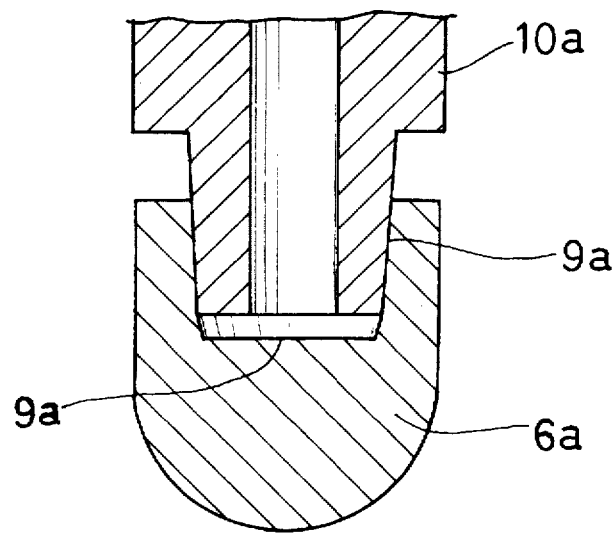
FIG. 6 is a cross sectional view illustrating a conventional electrode tip.

An arm 4 is fixed to the power transmission shaft 3 and includes an upper horizontal portion 4a, a lower horizontal portion 4b positioned below the upper horizontal portion 4a, and an upright portion 4b for connecting the upper and lower horizontal portions 4a and 4b so as to position the horizontal portions 4a and 4b in a face-to-face relationship with each other. The arm 4 is therefore has a substantially U-shape when viewed in front of it. The upper horizontal portion 4a of the arm 4 is bifurcated in a fork-like shape so as to form opposite inwardly facing surfaces 4d engageable with an electrode tip 6 to be removed, as illustrated in FIG. 2.

A robot arm 5 is fixed to a side wall of the apparatus body 1, and is movable in various directions, that is, upwards, downwards, forwards, rearwards and sidewards to serve as a means for driving the arm 4.

Referring to FIGS. 3 and 4, on a rear portion of the electrode tip 6 is formed opposite flat surfaces 8 which are respectively terminated by shoulders 7 closer to a forward end of the electrode tip 6, and a tapered mounting hole 9, into which a forward end of a shank 10 is press-fitted.

The distance X between the inwardly facing surfaces 4d of the arm 4 is set so as to be narrower than the distance Y between two diagonally opposite corners of the electrode tip 6.

In accordance with the arrangement of this embodiment, the removal operation of the electrode tip 6 from the shank 10 will be described hereinbelow.

The shank 10 with the electrode tip 6 thereon is fixed in position by an operator or a machine with a fixing mechanism in a conventional manner. The apparatus body 1 advances forwardly, that is, towards the electrode tip 6 via the robot arm 5, and the upper horizontal portion 4c is then fitted around the opposite flat portions 8 of the electrode tip 6 so that the electrode tip 6 is coaxially aligned with the power transmission shaft 3. In this regard, the inwardly facing surfaces 4d of the arm 4 contact the corresponding flat surfaces 8 of the electrode tip 6 when the distance X of the arm 4 is set to be substantially equal to the distance Y of the electrode tip 6. Otherwise, a clearance is defined between those surfaces.

The motor 2 is actuated so as to repeatedly rotate the arm 4 in the forward and reverse directions. The rotational force of the motor 2 is transmitted to the electrode tip 6, which rotational force causes the loosening of the electrode tip 6 with regard to the shank 10. Since the distance X of the inwardly facing surfaces 4d of the arm 4 is set to be smaller than the distance Y of the diagonally opposite corners of the electrode tip 6, the arm 4 abuts via the inwardly facing opposite surfaces 4d against the diagonally opposite surfaces of the electrode tip 6 at a point of the rotational path of the arm 4, even if the arm 4 is loosely fitted around the electrode tip 6.

Then, the apparatus body 1 is lowered via the robot arm 5 so that a lower surface of the upper horizontal portion 4a of the arm 4 abuts against the shoulders 7 of the electrode tip 6. A further lowering of the arm 4 causes the complete removal of the electrode tip 6 from the shank 10.

Thus, the removal of the electrode tip 6 can easily be accomplished, and the work efficiency for the replacement of the electrode tip 6 can be improved without increasing the work load.

The apparatus of the present invention is of a relatively simple arrangement, and therefore can be made in easy and cheap manner.

In this embodiment, the arm 4 is made of the upper and lower horizontal portions 4a and 4b, and the upright portion 4c in such a manner as to have a substantially U-shape as viewed in front thereof. However, the arm 4 may be varied in shape, provided that it is bifurcated so as to be engageable with opposite flat surfaces 8 formed in the circumferential surface of the electrode tip 6 and enable the arm 4 to rotate the electrode tip 6 in the above described manner.

The forward, reverse and sideward movement of the robot arm 5 is not essential to remove the electrode tip 6 from the shank 10. In addition, it is not essential to coaxially align the electrode tip 6 with the power transmission shaft 3. Instead, it is possible to employ such arrangement that the power transmission shaft 3 rotates the arm 4 about the axis of the electrode tip 6.

The means for rotating and vertically moving the arm 4 may also be modified within the scope of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. An electrode tip removal apparatus comprising:

an apparatus body:

a power shaft having a first and a second end, wherein said power shaft is rotatably attached to said apparatus body at said first end;

motor means for rotating said power shaft in a forward and reverse direction;

a bifurcate arm attached to said second end of said power shaft;

a bifurcated upper horizontal portion of said bifurcate arm, wherein said bifurcated upper horizontal portion comprises opposite engaging surfaces for engaging opposite flat surfaces formed in a circumferential surface of an electrode tip, whereby the electrode tip can be rotated in a forward and reverse direction to loosen said electrode tip.

2. An electrode tip removal apparatus according to claim 1, wherein a distance between said opposite engaging surfaces defined in said bifurcated upper horizontal portion is narrower than a distance between two diagonally opposite corners in the electrode tip.

3. An electrode tip removal apparatus according to claim 1, wherein said bifurcate arm further comprises:

a lower horizontal portion;

an upright portion connecting said lower portion and said upper horizontal portion; and wherein said lower horizontal portion is attached to said power shaft.

4. An electrode tip removal apparatus according to claim 1 further comprising:

a robot arm fixedly attached to said apparatus body, wherein said robot arm is upwardly and downwardly movable and movable away and toward the electrode tip, wherein said bifurcate arm can be lowered by lowering said robot arm while rotating the electrode tip to facilitate removal of the electrode tip.

* * * * *